United States Patent [19]
Heaton

[11] Patent Number: 6,132,541
[45] Date of Patent: Oct. 17, 2000

[54] BAND JOINING SYSTEM

[75] Inventor: Jonathan Andrew Sutcliffe Heaton, Oxenhope, United Kingdom

[73] Assignee: Bond-A-Band Transmissions Limited, Keighley, United Kingdom

[21] Appl. No.: 09/112,023

[22] Filed: Jul. 8, 1998

[51] Int. Cl.[7] ..................................................... B32B 31/12
[52] U.S. Cl. ........................... 156/82; 156/159; 156/258; 156/304.3; 156/304.5; 156/304.6
[58] Field of Search ............................. 156/82, 157, 159, 156/258, 304.1, 304.3, 304.5, 304.6

[56] References Cited

U.S. PATENT DOCUMENTS

| | | | |
|---|---|---|---|
| 3,449,186 | 6/1969 | Rano | 156/258 X |
| 4,080,235 | 3/1978 | Mandersson | 156/218 |
| 4,087,309 | 5/1978 | Lang | 156/497 |
| 4,366,014 | 12/1982 | Pollard | 156/157 |
| 4,407,691 | 10/1983 | Ishii et al. | 165/304.2 |
| 4,780,158 | 10/1988 | Thomas | 156/82 |
| 4,861,322 | 8/1989 | Reddick | 474/254 |
| 5,688,355 | 11/1997 | Yu | 156/272.8 |
| 5,698,358 | 12/1997 | Yu | 430/127 |

FOREIGN PATENT DOCUMENTS

| | | | |
|---|---|---|---|
| 2059539 | 4/1981 | United Kingdom | F16G 3/10 |

*Primary Examiner*—James Sells
*Attorney, Agent, or Firm*—Harrison & Egbert

[57] ABSTRACT

A band joining system including a method of preparing and making a join in a band, a tool for supporting the band when making the join and an attachment for a hot air gun to facilitate making the join. The tool has first and second arms pivotally attached to one another in a scissor type configuration and having first and second guide means associated with the arms for supporting band end regions during the formation of a join. According to the method, band ends are cut in such a fashion that they fit within guide regions of the guide means and supported in a configuration in which the hot air gun attachment may be interposed between the two band end regions supported in the tool, hot air applied to the band end regions and then compressive force used to bring the molten band end regions into contact with one another to form a welded join. The band end regions are cut such that each band end region retains elements of a central reinforcing member, those elements aiding the formation of a strong join.

19 Claims, 9 Drawing Sheets

BAND JOINING SYSTEM

TECHNICAL FIELD

The invention relates to a band joining system and to a method of preparing and making a join in a band, such as a transmission belt.

BACKGROUND ART

Bands and belts of the type envisaged by the present invention include belts having an internal reinforcing member typically made from textile fibers or wire strands, the reinforcing member being enclosed within the remainder of the belt which is an extrudate made up from TP polyester or polyurethane resins.

In order to provide a continuous band or belt from an extruded section, there are a number of prior art systems in existence.

A first prior art method involves butt welding. However, such butt welding methods tend to introduce a weakness at the join area and great care must be taken when aligning the two ends for welding.

A second prior art method involves utilizing connectors for joining one end of belt to another. While such a system may be quick and convenient, it tends to be compromised in terms of strength/performance.

In each of the abovementioned systems, there is introduced weakness into the system since the reinforcing member running through the belt is cut and strength of the join is compromised.

It is an aim of embodiments of the present invention to provide an improved method for preparing and making a join in bands/belts having a reinforcing member.

SUMMARY OF THE INVENTION

According to a first aspect of the invention, there is provided a method of making a join between two ends of banding material, the method comprising the steps of:

preparing a first of the two ends by removing a first amount of material of the band to form a first stepped region;

removing from an end region of the second of the two ends an amount of material of the band to form a second stepped region;

heating the first and second stepped regions to cause partial melting thereof; and bringing the heated first and second stepped end regions into contact so that the first and second stepped regions cooperate to form an overlapped welded join.

Preferably, the first amount of material is removed from above an internal reinforcing member of the first end of the band and the amount of material removed from the end region of the second of the two ends is removed from below a reinforcing member.

Preferably, the reinforcing members remain substantially intact following the removal of material.

Preferably, the reinforcing members of the first end region and second end region overlap in the welded join.

Preferably, the step of heating the first and second stepped regions is performed by applying hot air to those regions.

Preferably, following the steps of preparing the first and second ends, the first and second ends are supported in a special tool which allows the first and second ends to be held in opposed relation to one another and be heated.

Preferably, the tool in a first configuration allows the first and second stepped regions to be heated and, in a second configuration, brings the first and second stepped regions together and supports them during the formation of the join.

Preferably, during formation of the join, the first and second ends are squeezed together so as to hold them in compression. Efficient compression may be realized by ensuring that a first lateral side of the first stepped end is fully supported by the tool and a second lateral side of the second stepped end (which opposes the first lateral side of the first stepped end) is fully supported so that during compression pressure is brought to bear efficiently across the join.

Preferably, when forming the first and second stepped regions, the internal reinforcing member in the stepped regions of each band is left intact. Alternatively, in the case where multiple reinforcing strands are provided, one or more of the strands may be removed during the formation of the stepped areas, leaving the remainder to overlap during joining.

A finished join may be trimmed of flash in a finishing step.

According to a second aspect of the invention, there is provided a tool for holding, in use, first and second band end regions in close proximity during the formation of a welded join, the tool comprising:

first and second arms pivotally attached to one another in a scissor type configuration;

first and second guide means associated with the first and second respective arms, the first and second guide means being arranged to support respectively the first and second band ends during formation of the join.

Preferably, the first and second guide means each comprise a guide region having a channel formed therein, the channel having a cross-section approximating to the cross-section of the band and being arranged to receive respective first and second cut end regions of the band therein.

Preferably, the channels each comprise a base and two side walls. The side walls may be parallel. The side walls may be disposed such that in the first channel the side walls slope in a first direction with respect to the base and in the second channel the side walls slope in a second direction with respect to the base.

Preferably, when the band is approximately of a "V" section each channel is arranged to have one side wall which fully supports one side of the V-section and another side wall which leaves the other side of the "V" unsupported.

Preferably, in the first channel it is a first side of the "V" which is supported and in the second channel it is a second side which is supported.

Alternatively, the channels are of arcuate cross-section and are used to receive rounded band end regions.

Preferably, first and second removable covers are provided associated with the guide regions of the first and second respective guide means. The covers are preferably removable to allow extraction of a band after joining.

The first and second guide means are preferably pivotally attached to the respective first and second arms and, further, there is preferably provided a pair of sliding connections, such that, a slot formed in said first guide means is associated with a post of the second arm and a slot formed in the second guide means is associated with a post of the first arm, the arrangement being such that when handle regions of the first and second arms are squeezed together, the first and second guide means are arranged to move toward one another in a manner specified by the formation of the sliding connections and pivotal attachments.

According to a third aspect of the invention, there is provided an attachment for a hot air gun, the attachment comprising a nozzle comprising a first, inlet end for attachment to an air gun to receive hot air therefrom, and a second, outlet end, the second end having a plurality of apertures formed therein, the apertures being arranged to divert air which flows predominantly in a first direction at said first end, into a second direction, substantially perpendicular to the first direction.

Preferably, the first end is shaped so as to cooperate with an output of the hot air gun and the second end is comparatively flattened with respect to the first end, the second end having apertures formed on upper and lower surfaces thereof.

Preferably, the second end is adapted to cooperate with the tool of the second aspect, whereby the second end may be inserted, in use, between first and second band end regions so as to heat them while they are being held by the tool of the second aspect.

Preferably, an upper surface of the second end is shaped so as to conform with the formation of the first band end region and a lower surface thereof is shaped to conform to the formation of the second band end region.

The second end may be provided with a locator, at an approximate mid-point thereof, the locator being adapted to cooperate with locating means formed by cooperation of the respective guide means.

BRIEF DESCRIPTION OF THE DRAWINGS

For a better understanding of the invention, and to show how embodiments of the same may be carried into effect, reference will now be made, by way of example, to the accompanying diagrammatic drawings, in which.

Throughout the drawings hatched lines (---) represent hidden detail.

DETAILED DESCRIPTION OF THE INVENTION

Figure 1A:
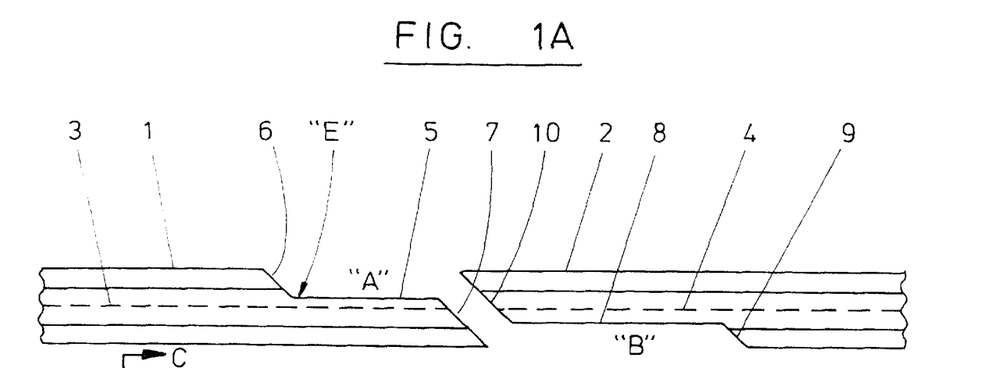
FIGS. 1A and 1B show a pair of transmission belt ends prepared for a joining operation.

Referring initially to FIG. 1, first 1, and second 2, band end regions are shown. The band end regions 1, 2 may in fact be the extreme ends of a single length of belting which is to be joined into a continuous loop or, alternatively, they may be ends of separate lengths of belting which, for one reason or another, simply need to be joined together.

The belt material comprises, in general, an extrusion of plastics material such as TP polyester or polyurethane resin with an internal reinforcement 3, 4. The reinforcement 3, 4 may comprise a single reinforcing member or a plurality of reinforcing members made up of textile fibres, wire strands etc.

In order to prepare the end regions 1, 2 for joining together, they are cut as shown in FIG. 1 such that a first amount of material "A" is removed from the belt end region 1 so as to form a stepped area comprising a ledge region 5 on one side of which the reinforcing member 3 is retained along with the extrudate material. The formation of this stepped region is made by performing a number of cuts, comprising a first angled cut 6, a second straight cut to form the ledge 5 and a third angled cut 7.

In similar fashion to that described for the band end region 1, band end region 2 is prepared for joining by removing material from a region "B" from one side of the band 2 at the band end region and forming a ledge 8, on one side of which there is the reinforcing member and the remainder of the extrudate material and on the other side of which the material is absent. The particular form which it is desired to bring about on the band region 2 is a stepped form which complements the stepped formation on the end region 1. To do this, a first angled cut 9 is made, a second straight cut along ledge 8 is made and a third, angled, cut 10 is made.

Figure 2:
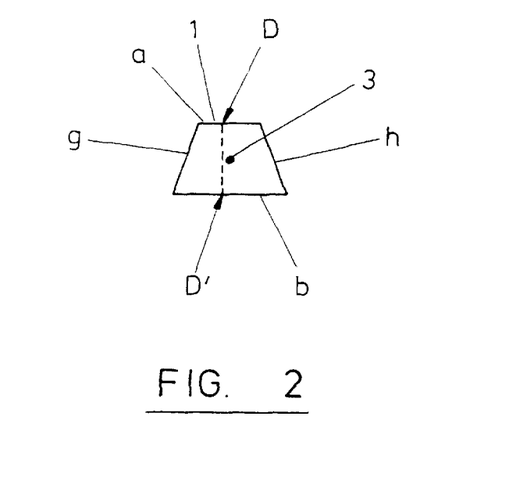
FIG. 2 shows a cross-sectional view along line C–C' showing the formation of the belt of FIG. 1.

FIG. 2 is a cross-sectional view which shows that the band in question is a "V" type belt having a narrow top surface "a" and a wider bottom surface "b". Comparing FIGS. 1 and 2 it will be seen that the line D–D' represents the cut marked at point "E" in FIG. 1A.

In order to assist accurate cutting of the band at the end regions 1, 2, a cutting template or special cutting tool may be provided.

It should be noted that for both end regions 1, 2, the reinforcing member 3, 4 is left largely intact. Where the reinforcing member comprises multiple strands, one or more of those multiple strands may be removed, but a majority remainder is retained at each band end region 1, 2 so that when a join is made, there is provided an overlapping of reinforcing members to at least some degree. A view of a finished join is shown in FIG. 1B to illustrate the concepts discussed above in relation to FIG. 1A.

Figure 1B:
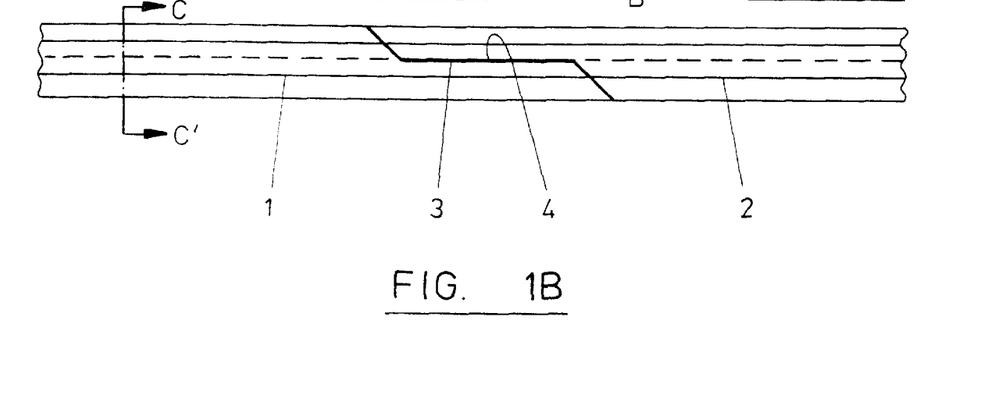

Referring to FIG. 1B, it can be seen that the stepped regions of the band end regions 1, 2 overlap and that, at the very center of the join, reinforcing members 3, 4 overlap each other.

In order to form a join such as that shown in FIG. 1B, the extrudate material of the band end regions 1, 2 adjacent to the join area (i.e. the regions closest to the stepped areas) are locally heated such that material at these boundary regions melts. Once material at the boundary regions is in a molten state, the two end regions are brought together in the configuration shown in FIG. 1B to form a welded join.

By forming an overlap join in this manner, the join strength relies on the shear strength of the mating surfaces which is enhanced by the adhesion of each of the reinforcing members to the extrudate. In particular, it will be appreciated that, in contrast to butt welding, since the join is constituted by a larger area then this will contribute to an enhanced strength and, by including both reinforcing members, each of those members will adhere to both sides of the join. In other/words, by cutting the band end regions such that regions of the reinforcing members are practically exposed, each reinforcing member will contact material on both sides of the join.

Figure 3A:
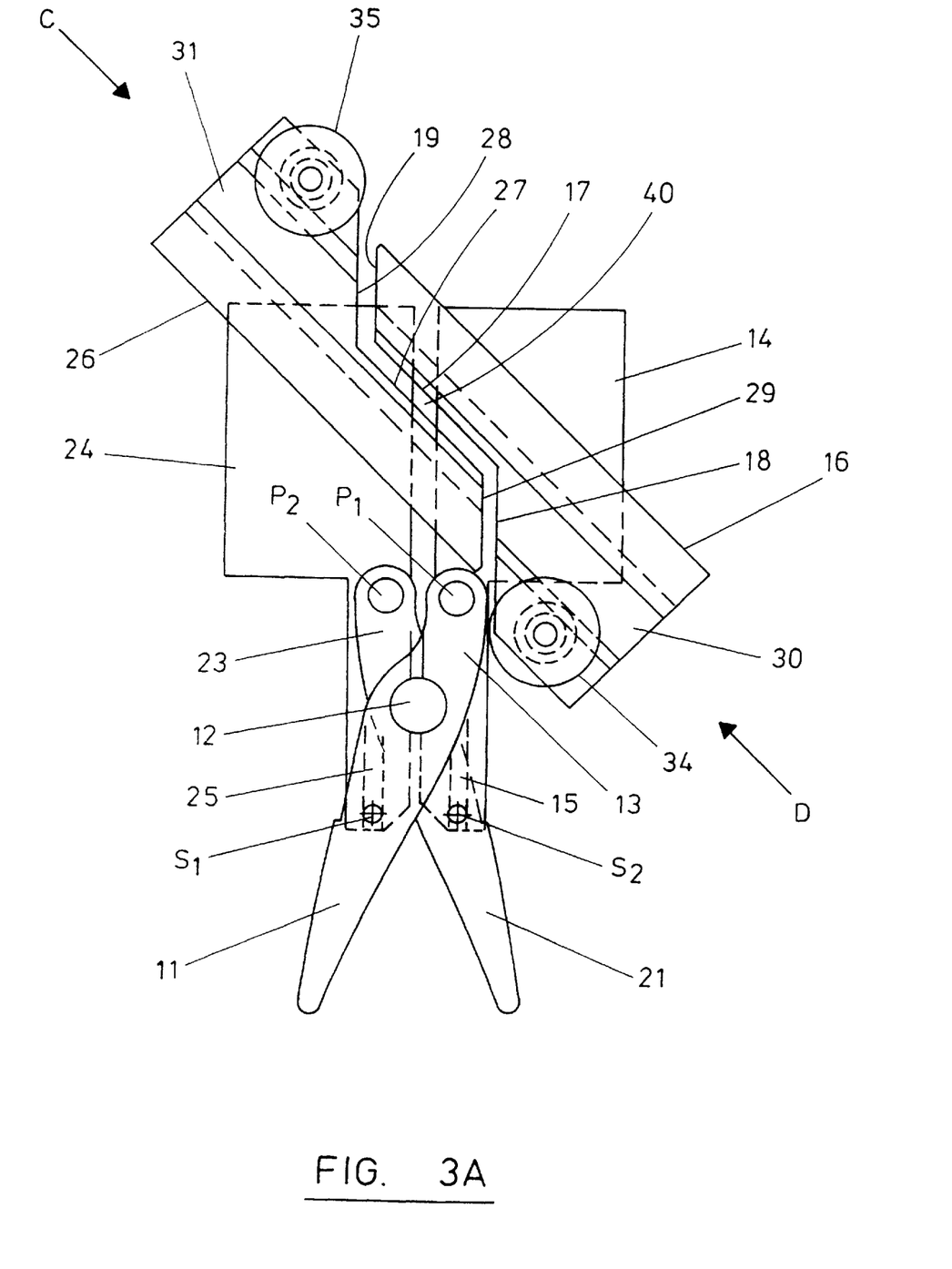
FIGS. 3A and 3B are front and reverse views respectively showing a tool which is arranged for aiding the joining operation.
Figure 3B:
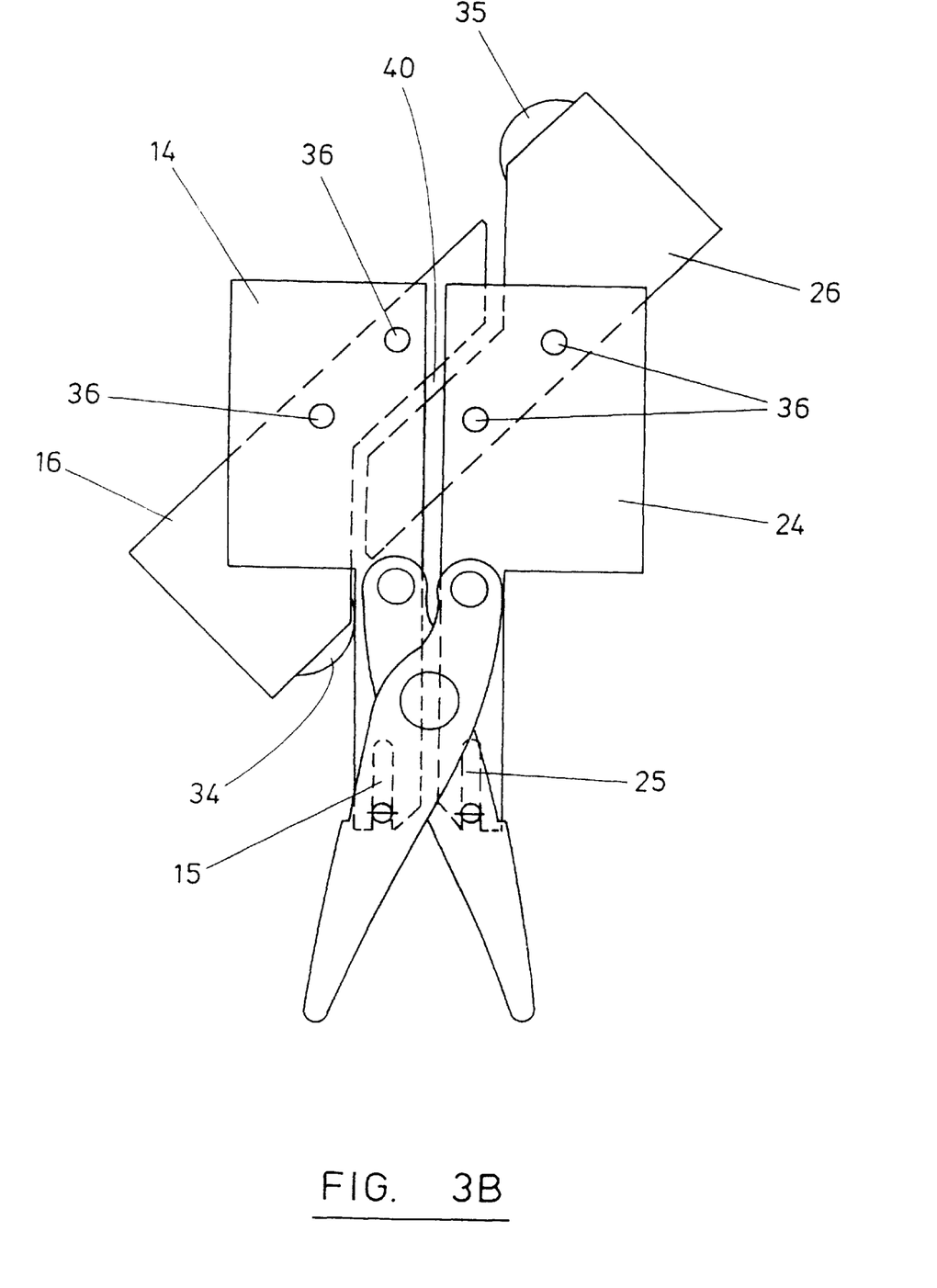

Referring now to FIGS. 3A and 3B, a tool for holding prepared ends of belting material is shown. The tool comprises a pair of pivotally mounted arms 11, 21, the arms having a scissor type action such that when they are squeezed together and rotated about common pivot point 12, their extreme ends 13, 23 move toward one another. Pivotally attached to the extreme ends 13, 23 of arms 11, 21 respectively are provided guide means comprising blocks of material 14, 24 fixedly attached to respective guide regions 16, 26. Each block of material 14, 24 has a pivotal connection, P1, P2, and is also provided with a sliding connection given by movement of sliders S1, S2 fixedly provided on arms 11, 21 and adapted for movement within slots 25, 15 respectively of blocks of material 24, 14.

The guide regions 16, 26 of the guide means may be attached to the blocks of material 14, 24 by screw fixings or similar or, of course, in other embodiments may be integrally casted or moulded etc. so as to cooperate directly with the arms 11, 21.

Figure 4:
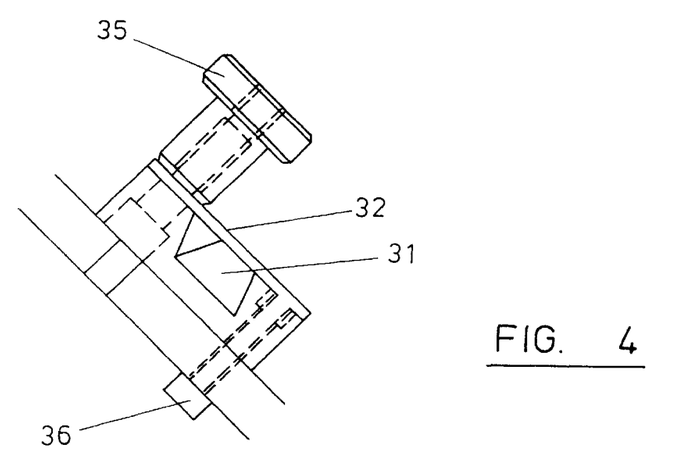
FIG. 4 shows detail of part of the tool of FIG. 3.

The guide region 16 has an internal channel 30 to receive a first end region of extruded belt material and the second guide region 26 also has an internal channel 31 to receive the other end region. These channels are shown by hatched and solid lines in FIG. 3A but may be seen more clearly by referring to FIG. 4 which is an end view from arrow C on FIG. 3A. The channels are covered by removable plates 32, (only one of which is shown in FIG. 4) so that the covered channels provide complete support for the two end regions of banding material. The top plates 32 are removably held in position by thumb wheels 34, 35 which allow the plates to be taken off (as in FIG. 3A) so that after a join has been made, the banding material may be removed from the tool. Further features of the tool are shown in FIGS. 3B and 4, such as fixing means 36 for attaching the guide regions to their respective blocks of material. There is also shown in FIGS. 3A and 3B a gap 40 which is formed by the cooperating guide means and which, as will be explained later, serves as a locating means.

Figure 6A:
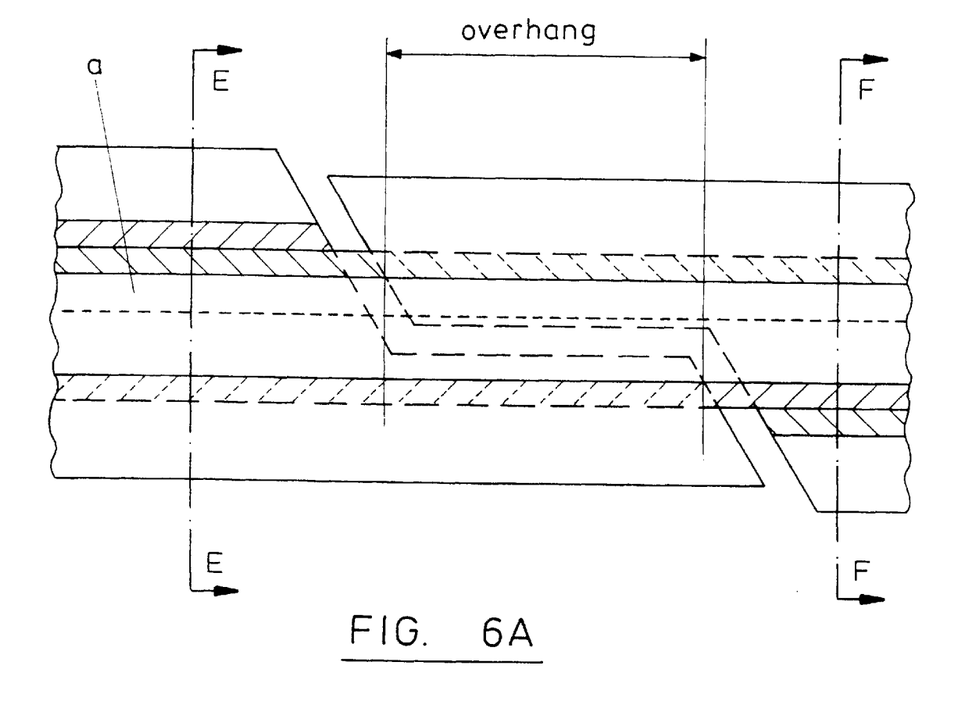
FIGS. 6A to 6C show details of the channel regions of the tool of FIGS. 3A and 4.
Figure 6B:
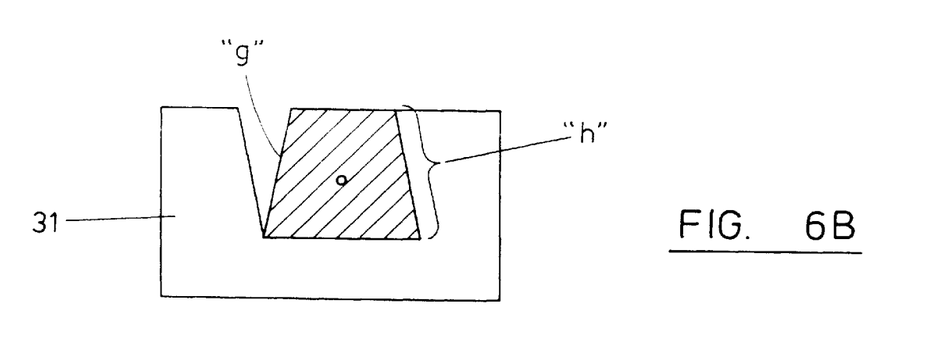
Figure 6C:
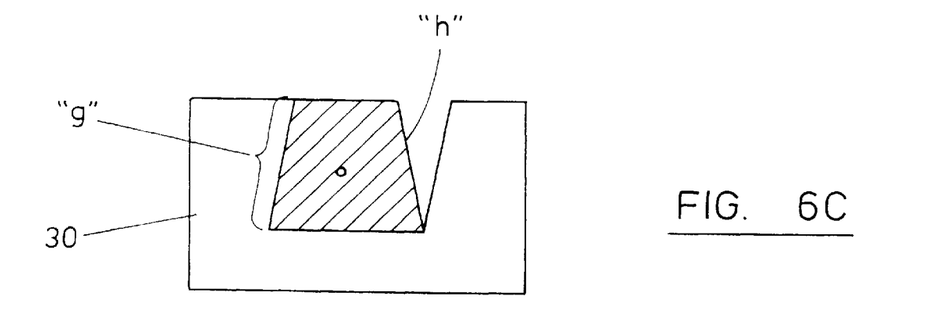

FIGS. 6A, 6B and 6C show the formation of the channels 31, 30. As can be seen, the band of the example has a "V" type formation and the channels 30, 31 each have parallel sloping sides, but those sides slope in opposite directions such that a side wall "g" of band end 2 and a side wall "h" of band end 1 are enclosed by an overhanging side wall of channels 30, 31 whereas side walls "h" of band end 2 and "g" of band end 1 are not.

Figures 5, 5C:
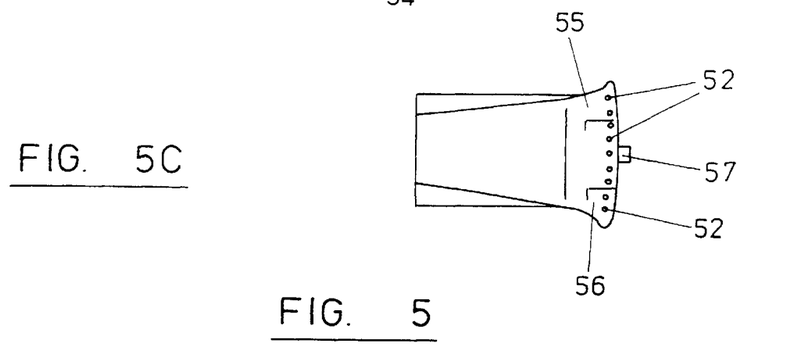
FIGS. 5A to 5C show respectively a side view, a view in the direction of arrow "A" of FIG. 5A and a view in direction of arrow "B" of FIG. 5A of a nozzle for use with a hot air gun for preparation of a join.
Figure 5A:
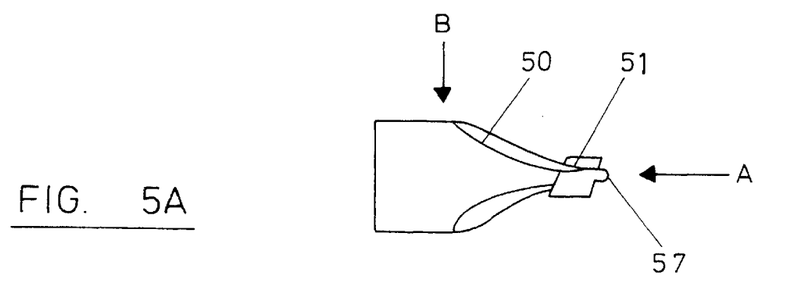
Figure 5B:
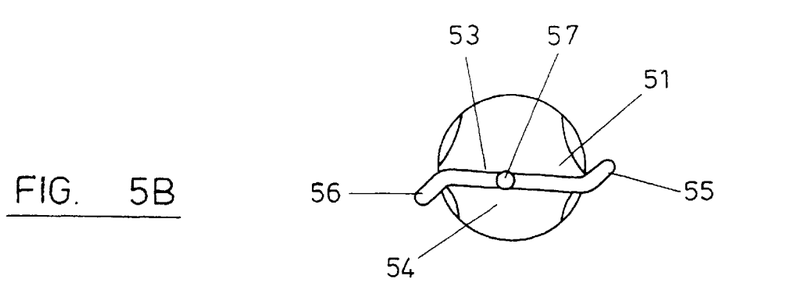

Referring now to FIGS. 5A to 5C, there is shown a nozzle for a hot air gun for use with the apparatus of the present invention. The nozzle 50 is adapted for use with a hot air gun having a circular output attachment, the nozzle 50 being adapted to mate with such circular output. The main feature of the nozzle 50 is a snout region 51 of the nozzle which has a plurality of holes 52 formed therein both on a top side 53 and a bottom side 54 thereof, for reasons which will be explained later, the snout 51 has a turned up region 55 at one end and a turned down region 56 at the other with a substantially horizontal region linking the two ends. At a mid-point between the two ends, there is provided a locator 57.

The method of joining and welding together end regions of a belt will now be described with reference to FIGS. 3 to 5.

Firstly, the prepared belt end region 1 is inserted into guide region 26 and, similarly, the prepared belt end region 2 is inserted into guide region 16 of the tool of FIG. 3. The end regions are inserted such that the cut areas 5, 6, 7 of the band end region 1 are flush with, or nearly flush with a mating surface 27, 28, 29 of the guide 26 and that the cut regions 8, 9, 10 are flush with or nearly flush with mating surfaces 17, 18, 19 of the guide 14.

To provide proper seating and aid manipulation of the cut end regions within the guides 16, 26, the scissor type arrangement of arms 11, 21 may be opened as far as possible, such that sliders S1, S2 move further into slot regions 25, 15 and end regions 13, 23 of the arms 11, 21 move apart, which, in turn, moves guide regions 16, 26 apart.

Once the end regions 1, 2 are seated correctly within their respective guides 26, 16, with the cover plates 32 in place the tool may be brought into a condition in which there is a gap between mating surfaces 27, 28, 29 and 17, 18, 19 of the respective guides sufficiently large for the snout region 51 of the nozzle 50 to be inserted therebetween. With the nozzle so attached to a hot air gun the snout 51 is then inserted with locator 57 resting within gap 40 and the snout 51 extending between surfaces 17 and 27 with the turned up end 55 between surfaces 19/28, the turned down end 56 between surfaces 13/29 and the middle region between surfaces 17/27. The air gun is then brought into operation so as to expel hot air through apertures 52 on both upper 53 and lower 54 surfaces of snout 51. The hot air from the apertures 52 melts the extrudate material of the band end regions and, when the material is in a molten state (which takes only a few seconds), the nozzle 50 may be extracted from between the gap formed by surfaces 17, 27 and the two arms 11, 21 may be squeezed together which, in turn, causes the gap between the molten surfaces of the two band end regions 1, 2 to be reduced and brings the molten regions into contact with one another. The arms 11, 21 may be then pressed further together and held in this configuration to compress the material in the join region until the join has cooled somewhat. It will be appreciated from FIGS. 6A to 6C that as pressure is applied by the tool the opposing overhanging regions of the channels 30, 31 force the band end regions to be compressed in the area of the cooperating overhang shown in FIG. 6A. In this way the pressure applied by closing the tool is efficiently applied to the specific area around the join. Once the join has fully cooled, cover plates 32, 33 may be removed by unscrewing thumb wheels 34, 35 and the joined belt may be removed.

It will be appreciated that the abovementioned method may be applied to many different types of belt section and, in the case of "V" sections as described above, the tool is arranged to hold the join area of such sections in an efficiently compressed fashion as an inverted V so that the finished join is perfectly aligned.

A procedure and tool for joining together the ends of circular cross-section transmission belts will now be described with reference to FIGS. 7 to 12. In this discussion, the same basic principles are involved as with the above-described system and similar elements will be denoted by like reference numerals to those above, but are further denoted by a prime. In other words, a first band end region of the circular cross-section transmission belt is denoted by 1'.

Figure 7:
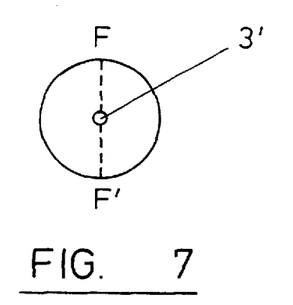
FIG. 7 and FIG. 8 are, respectively, a cross-sectional view through the core of and a view from above of a cut end region of a circular cross-section transmission belt.
Figure 8:
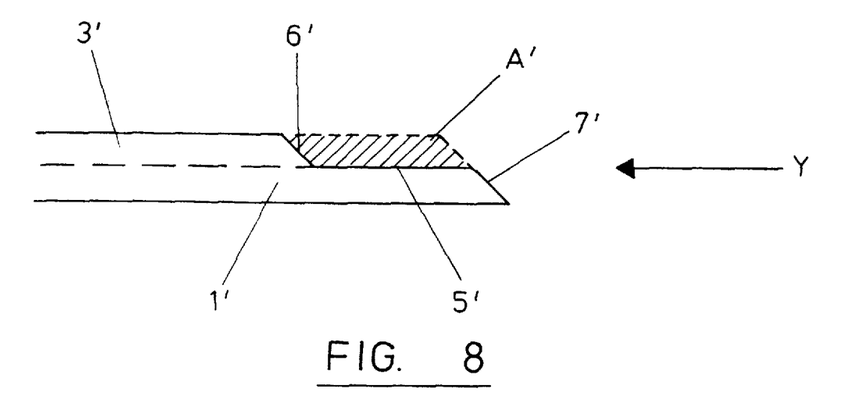

Considering initially FIGS. 7 and 8, there is shown a first band end region 1'. Although only one band end region 1' is shown, it will be appreciated that the band end region to which the first band end region is to be joined must be cut in a complementary fashion to the first band end region.

As with the "V" type belts, the belt material comprises, in general, an extrusion of plastics material with an internal reinforcement 3' which may be a single reinforcing member or a plurality of reinforcing members made up of textile fibers, wire strands etc.

End regions of the circular cross-sectional belt are cut in similar fashion to the V-belt shown in FIG. 1 such that a first amount of material represented by the shaded region A' is removed from the belt end region 1' so as to form a stepped area comprising a ledge region 5' on one side of which the reinforcing member 3' is retained along with the extrudate material. The formation of this stepped region is made by performing a number of cuts, comprising a first angled cut 6', a second cut to form the ledge 5' and a third angled cut 7'.

Considering FIG. 7, the broken line F-F' represents the position of the ledge 5' when the circular cross-section transmission belt is viewed end-on from arrow Y.

As with the "V" belts, it should be noted that for both end regions of the circular cross-section belt, the reinforcing member 3' is left largely intact. Where the reinforcing member comprises multiple strands, one or more of those multiple strands may be removed, but a majority remainder is retained at each band end region, so that when a join is made, there is provided an overlapping of reinforcing members to at least some degree.

As before, in order to perform a join, the extrudate material of the band regions adjacent to the join area are locally heated such the material at these boundary regions melts. Once material at the boundary regions is in a molten state, the two end regions are brought together to form a welded join.

Referring now to FIGS. 9A, 9B, 10, 11 and 12, a tool for holding prepared ends of belting material will be described. Again, like or similar elements to those described in relation to the tool for joining V belt material will be denoted by like numerals with an added prime.

Figure 9A:
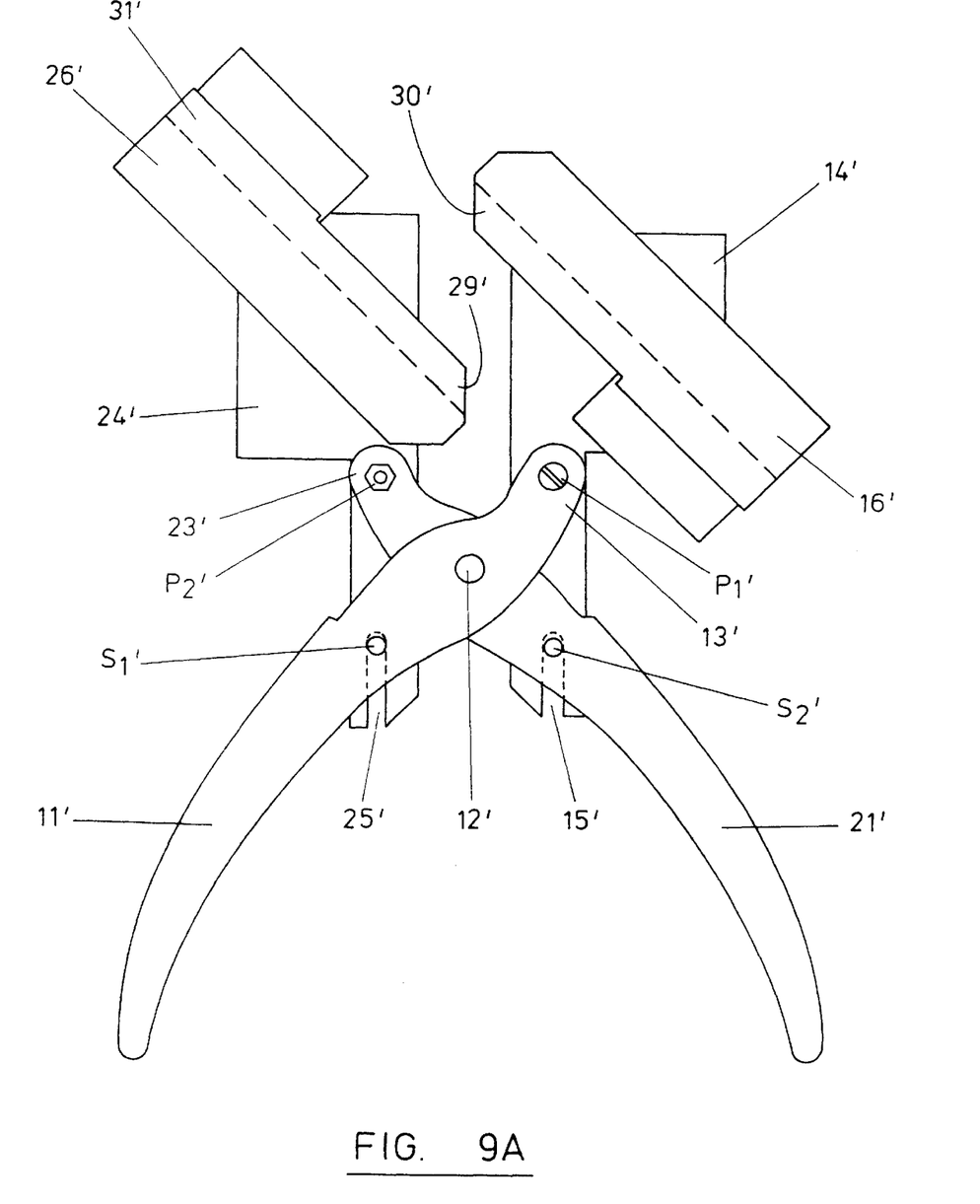
FIG. 9A and FIG. 9B are front and reverse views respectively showing a tool which is arranged for aiding the joining operation of a circular cross-section transmission belt.
Figure 9B:
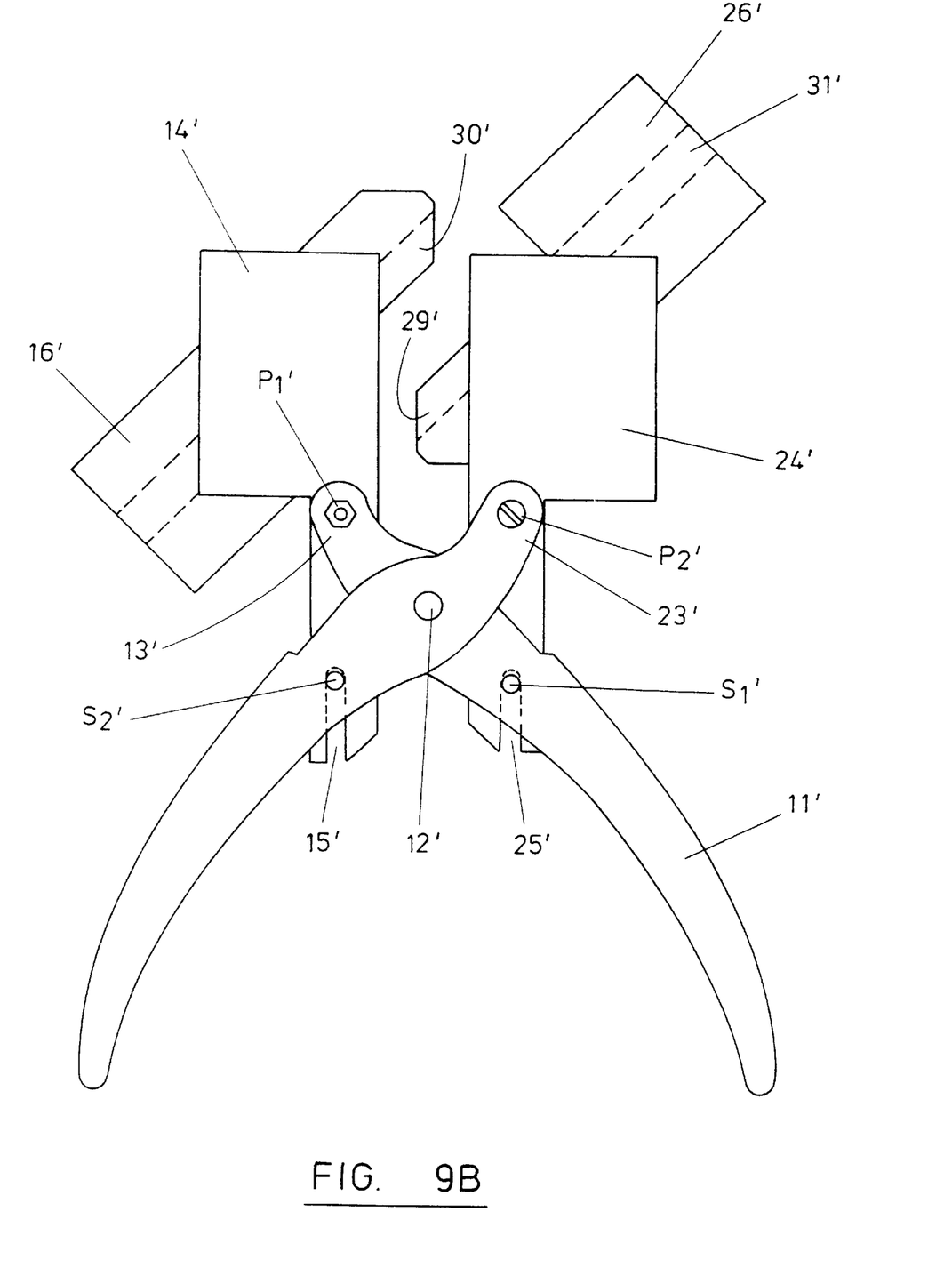

Referring to FIGS. 9A and 9B, the tool comprises a pair of pivotally mounted arms 11', 21', the arms having a scissor type action such that when they are squeezed together and rotated about common pivot point 12', their extreme ends 13', 23' move toward one another. Pivotally attached to the extreme ends 13', 23' of arms 11', 21' respectively are provided guide means comprising blocks of material 14', 24' fixedly attached to respective guide regions 16', 26'. Each block of material 14', 24' has a pivotal connection P1', P2', and is also provided with a sliding connection given by movement of sliders S1', S2' fixedly provided on arms 11', 21' and adapted for movement within slots 15', 25' respectively of blocks of material 24', 14'.

The guide regions 16', 26' of the guide means may be attached to the blocks of material 14', 24' by screw fixings or similar or, of course, in other embodiments may be integrally casted or moulded etc. so as to cooperate directly with the arms 11', 21'.

The guide region 16' has an internal channel 30' which is rounded so as to cooperate with the outer periphery of the end region of a circular cross-section transmission belt and the second guide region 26' also has an internal channel 31' of similar formation. These channels are illustrated by broken lines in FIGS. 9A and 9B, but their formation is shown more clearly by referring to FIG. 12 which shows the channel region 31' with a piece of belting material resting in it and held in place by clamping means 32' which will be described in more detail shortly with reference to FIG. 10.

Figure 10:
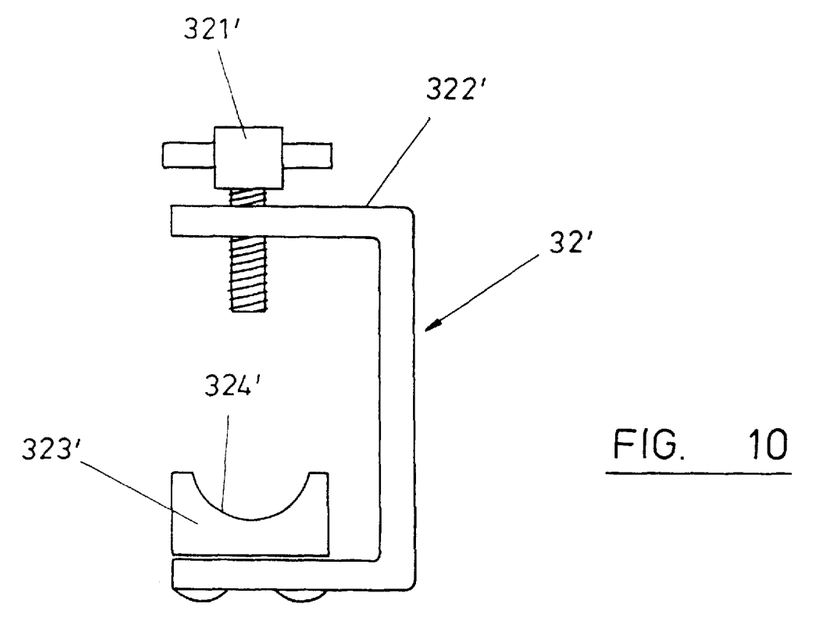
FIG. 10 shows a clamp for use with the tool of FIGS. 9A and 9B.
Figure 11:
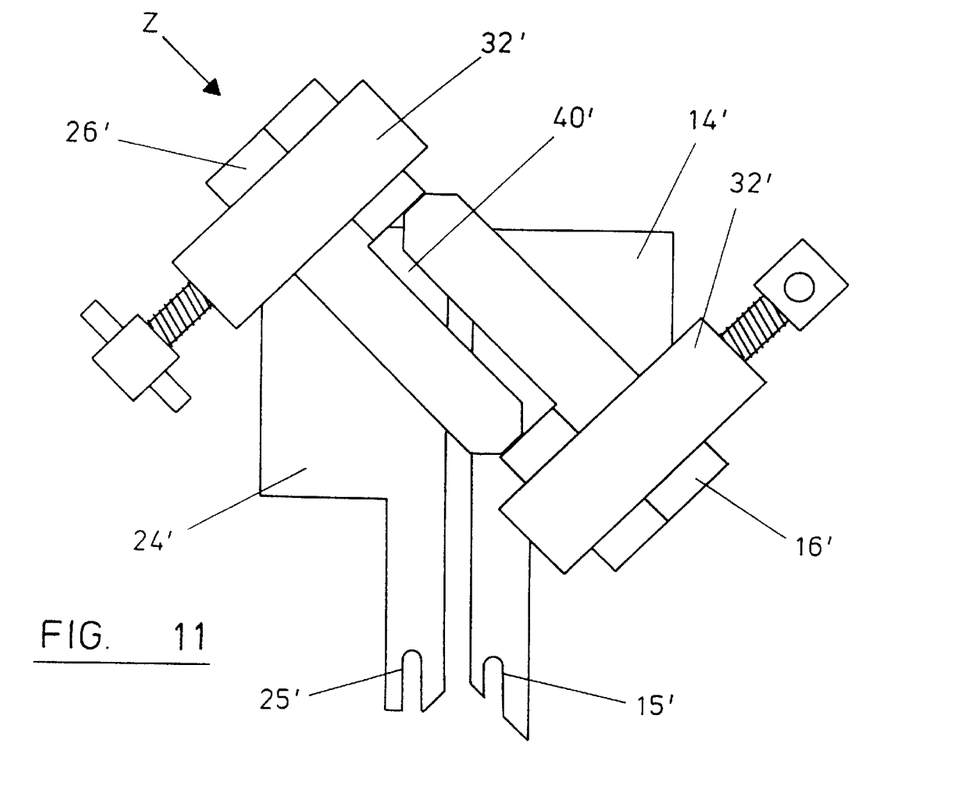
FIG. 11 is a view showing detail of the tool of FIGS. 9A and 9B with two clamps of the type shown in FIG. 10 in position.
Figure 12:
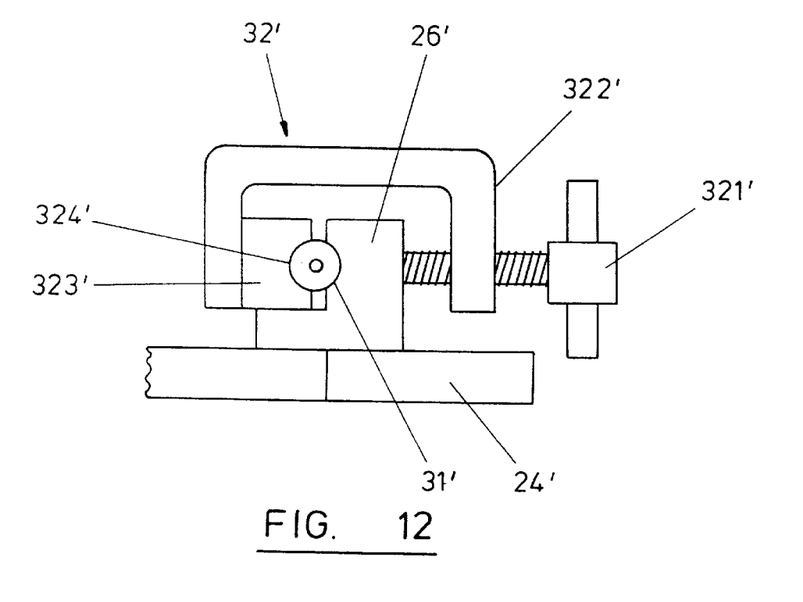
FIG. 12 is an end-on view from the direction of arrow Z showing detail of the arrangement of FIG. 11, shown with a circular cross-section transmission belt in place.

In use, the channels 30, 31 are coverable by removable clamps 32' (which are shown in detail in FIG. 10) these clamps are shown in position in FIGS. 11 and 12, but are absent from FIGS. 9A and 9B for reasons of clarity. The removable clamps 32' are provided so that, when they are in place, the channels formed by these clamps and the channels 30', 31' of the guide regions 16', 26' provide complete support for the two end regions of banding material.

The clamps 32' comprise a threaded thumb wheel member 321', a U-shaped piece of material 322' having an internally threaded hole adapted to cooperate with a threaded member of the thumb wheel 321' and a block of material 323' having a channel 324' formed therein, this channel 325' being of like radius to channels 30', 31'.

Referring now to FIG. 11, there will now be described how the clamps 32' cooperate with the guide regions 16', 26' when they come together to form a gap 40' which serves as a locating means in the same manner as the gap 40 described in relation to FIGS. 3A and 3B. In FIG. 11, the arms 11', 21' are not shown for reasons of clarity.

Joining and welding together of the end regions of a circular cross-section belt will now be described.

Firstly, the prepared belt end regions are inserted into guide regions 16', 26' of the tool of FIGS. 9A to 12. The end regions are inserted such that the cut surface 7' of the band end region 1' sits approximately flush with the angled surface 29' of the guide region 26', the other band end region is arranged in similar fashion with respect to guide region 16'.

To provide proper seating and aid manipulation of the cut end regions within the guides 16', 26', the scissor type arrangement of arms 11', 21' may be opened as far as possible, such that sliders S1', S2' move further into slot regions 25', 15' and end regions 13', 23' of the arms 11', 21' move apart, which, in turn, moves guide regions 16', 26' apart.

Once the end regions are seated correctly within their respective guides 26', 16' with the clamps 32' in position, the tool may be brought into a condition in which there is a gap 40' formed, as shown in FIG. 11. This gap 40' is sufficiently large for the snout region 51 of the nozzle 50 to be inserted therebetween. With the nozzle so attached to a hot air gun, the snout 51 is inserted with locator 57 resting within gap 40'. The air gun is then brought into operation so as to expel hot air through apertures 52 on both upper 53 and lower 54 surfaces of snout 51. The hot air from the apertures 52 melts the extrudate material of the band end regions and, when the material is in a molten state, (which takes only a few seconds), the nozzle 50 may be extracted from the gap 40' and pressure maintained on the two arms 11', 21 will cause the molten regions of the band ends to come into contact with one another to form the weld. Once the join has fully cooled, the clamps 32' may be removed by unscrewing thumb wheels 321' and the joined belt may be removed.

Finished joins may be trimmed of flash and then are ready for use.

It will be appreciated that although only round cross-sectional belts and V-shaped belts have been discussed herein, the invention is of application to belts of any given arbitrary cross-section.

The system has many advantages over currently existing systems. Firstly, because the join is made over a large area, it is stronger than other commonly used welded joins. Secondly, because the reinforcing member of each band end is retained, largely in tact, the welding operation joins reinforcing strands from one band end region into the material of the second end region and vice versa and extra strengthening of the join thereby occurs.

Furthermore, join strength relies on the shear strength of the mating surfaces and this is increased.

Furthermore, by utilising a hot air gun with locally applied heating, the band end regions may be brought to a molten state very much quicker than with prior art arrangements which often use a hot knife type instrument to provide surface heating.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of making a joint between a first end and a second end of a band, the method comprising:

preparing the first end by removing a first amount of material from the band to form a first stepped region;

removing a second amount of material from the second end of the band to form a second stepped region;

locating said first and second stepped regions respectively in first and second guides associated respectively with first and second arms of a tool, said first and second arms being pivotally attached to another in a scissor-type configuration so as to hold the first and second ends in opposed relation to one another;

inserting a nozzle of an air gun between said first and second stepped regions;

heating said first and second stepped regions by applying hot air thereto via a plurality of air outlet apertures defined by said nozzle;

extracting said nozzle from between said first and second stepped regions after said first and second stepped regions have been heated to a temperature sufficient to weld said first and second stepped regions together; and moving said first and second arms of said tool relative to one another to bring the heated first and second stepped regions into contact and fuse together to form an overlapped welded joint.

2. The method of claim 1, wherein said first amount of material is removed from above a reinforcing member at the first end and the second amount of material is removed from below another reinforcing member.

3. The method according to claim 2, wherein said reinforcing members remain substantially intact following said step of removing material.

4. The method according to claim 3, wherein said reinforcing members of overlap in said welded joint.

5. The method of claim 1, said step of moving comprising:

squeezing the first and second ends together so as to hold the heated first and second stepped regions in compression.

6. The method according to claim 1, wherein the first and second ends are respectively located in first and second channels defined by the first and second guides.

7. The method according to claim 6, wherein said first and second channels are each defined by a base wall and two side walls.

8. The method according to claim 7, wherein the side walls are parallel.

9. The method according to claim 7, wherein the side walls are disposed such that the side walls of said first channel slope in a first direction with respect to the base and the side walls of said second channel slope in a second direction with respect to the base.

10. The method according claim 7, wherein when the band is approximately of "V" cross-section and each channel is arranged to have a first side wall which fully supports one side of the "V" cross-section and a second side wall which leaves the other side of the "V" cross-section unsupported.

11. The method according to claim 10, wherein a first side of the "V" section is supported in said first channel and a second side of the "V" section is supported in said second channel.

12. The method according to claim 6, wherein first and second removable covers are affixed respectively over said first and second channels of said first and second guides respectively.

13. The method according to claim 6, wherein said first second channels are of arcuate cross-section and are adapted to receive rounded band end regions.

14. The method according to claim 1, wherein said first and second guides are respectively pivotally attached to said first and second arms.

15. The method according to claim 14, wherein a pair of sliding connections are provided such that a first slot defined by the first guide is associated with a post of said second arm and a second slot defined by said second guide is cooperative with a post of said first arm such that when respective handle regions of said first and second arms are squeezed together the first and second guides move toward one another in a manner determined by the sliding connection and the pivotal attachment between the first and second arms.

16. The method according to claim 1, wherein said nozzle comprises an inlet end and an outlet end defining the plurality of air outlet apertures, said air outlet apertures are disposed to divert air which enters and flows through said nozzle predominantly in a first direction into a second direction that is substantially perpendicular to the first direction.

17. The method according to claim 16, wherein said outlet end of said nozzle is comparatively flattened with respect to said inlet end, said outlet end defining air outlet apertures on first and second flattened surfaces thereof.

18. The method according to claim 17, wherein said first flattened surface of said outlet end of said nozzle is shaped so as to conform with the first end and said second flattened surface of said outlet end of said nozzle is shaped so as to conform to the second end.

19. The method according to claim 1, wherein said nozzle has a locator at an approximate mid-point thereof, said locator adapted to cooperate with a locating means formed by cooperation of the first and second guides.

* * * * *